US008650940B2

(12) United States Patent
Howard et al.

(10) Patent No.: US 8,650,940 B2
(45) Date of Patent: Feb. 18, 2014

(54) MASTER COMPONENT FOR FLOW CALIBRATION (75) Inventors: Darren L. Howard, Weymouth (GB); Andrew Hewitt, Derby (GB); Philip Ridland, Bristol (GB); Michiel Kopmels, Bristol (GB)

(73) Assignee: Rolls-Royce PLC, London (GB)

( * ) Notice: Subject to any disclaimer, the term of this patent is extended or adjusted under 35 U.S.C. 154(b) by 22 days.

(21) Appl. No.: 13/466,581

(22) Filed: May 8, 2012

(65) Prior Publication Data

US 2013/0025351 A1 Jan. 31, 2013

(30) Foreign Application Priority Data

Jul. 26, 2011 (GB) .................................. 1112803.0

(51) Int. Cl.
*G01M 15/00* (2006.01)

(52) U.S. Cl.
USPC ...................................................... 73/112.01

(58) Field of Classification Search
USPC ...................................................... 73/112.01
See application file for complete search history.

(56) References Cited

U.S. PATENT DOCUMENTS

| | | | | |
|---|---|---|---|---|
| 6,772,627 | B2 * | 8/2004 | Fleming | 73/147 |
| 6,857,325 | B2 * | 2/2005 | Sato | 73/861.79 |
| 6,923,051 | B2 * | 8/2005 | Fleming | 73/147 |
| 6,941,805 | B2 * | 9/2005 | Seidel et al. | 73/170.02 |
| 7,024,929 | B2 * | 4/2006 | Fleming et al. | 73/147 |
| 7,201,564 | B2 * | 4/2007 | Bolms et al. | 416/97 R |
| 7,434,453 | B2 * | 10/2008 | Hogarth et al. | 73/114.77 |
| 7,555,892 | B2 * | 7/2009 | Vosberg | 60/39.53 |
| 7,654,144 | B2 * | 2/2010 | Yoon et al. | 73/639 |
| 7,682,133 | B1 | 3/2010 | Liang | |
| 7,685,870 | B2 * | 3/2010 | Quinn et al. | 73/112.01 |
| 7,971,473 | B1 * | 7/2011 | Meunier et al. | 73/112.01 |
| 8,147,188 | B2 * | 4/2012 | Reeves et al. | 415/177 |
| 8,438,915 | B2 * | 5/2013 | McCall et al. | 73/112.01 |
| 2003/0180147 | A1 | 9/2003 | Bolms et al. | |
| 2003/0209084 | A1 * | 11/2003 | Fleming | 73/861.74 |
| 2007/0234737 | A1 | 10/2007 | Vosberg | |
| 2010/0003127 | A1 | 1/2010 | Reeves et al. | |

FOREIGN PATENT DOCUMENTS

| | | |
|---|---|---|
| GB | 2 105 415 A | 3/1983 |
| GB | 2 365 930 A | 2/2002 |

OTHER PUBLICATIONS

British Search Report issued in British Application No. GB1112803.0 on Oct. 11, 2011.

* cited by examiner

*Primary Examiner* — Freddie Kirkland, III
(74) *Attorney, Agent, or Firm* — Oliff PLC (57) ABSTRACT

A master component is provided for use in checking for any variation in the performance of a gas turbine test facility. The master component replaces a standard component, which is typically a turbine blade, vane or segment in the test facility. The master component is attached to the test facility in the same manner as the standard component. The flow rate through the master component is substantially the same as the flow rate through the standard component for a given inlet and outlet temperature and pressure. The flow through the master component is simpler than the flow through the standard component. This means that the flow through the master component is less likely to vary over time. As such, the master component is more suitable for use in checking for any variation in the performance of a test facility.

17 Claims, 3 Drawing Sheets

MASTER COMPONENT FOR FLOW CALIBRATION

CROSS-REFERENCE TO RELATED APPLICATIONS

This application is based upon and claims the benefit of priority from British Patent Application Number 1112803.0 filed 26 Jul. 2011, the entire contents of which are incorporated by reference.

BACKGROUND OF THE INVENTION

1. Field of the Invention

This invention relates to a master component for simulating the flow through a component of a gas turbine engine. The invention relates to a master component for simulating the flow through an aerofoil element of a gas turbine engine, for use in flow calibration.

2. Description of the Related Art

The gas turbine engine is a highly sophisticated and complex device which depends upon all the component parts achieving their respective levels of performance to achieve the design targets, for example in terms of life and cost of ownership. Overall engine performance is evaluated immediately prior to delivery to the customer and during main engine development testing. However, various components and systems need to be evaluated (for example tested and/or proven) prior to engine installation. System/component performance evaluation consists of many facets. An important aspect of the evaluation relates to the specified air flow through and/or around the components being evaluated.

Typically, evaluation of components and systems may be performed at a number of different test facilities. These different test facilities may be geographically separate from each other. The different test facilities must have consistent performance relative to each other, for example in order to enable tests conducted at different test facilities to be used to compare different systems and/or components.

In order to assess system consistency, and to allow comparisons between test facilities where required, master components, which may be referred to as calibration components, are used.

Typically, a master component is simply a component has the same geometry as the design component (or design baseline component), and is calibrated by a suitable approved facility. The component may be a scrap part but the system geometry and performance is typically to the design specification.

Once the master component has been calibrated by a suitable approved facility, it is then sent to a test facility, where it has to perform the same as in the approved facility (e.g. in terms of flow) to within an agreed tolerance. Once this has been achieved, the master component is used at regular intervals to ensure that the facility is performing in a stable manner.

The master component is thus intended to be used to check for any variation in the performance of the test facility itself. However, it has been found that conventional master components, which are simply dedicated components that have the same geometry as the design component, exhibit variation in performance over time. This means that it is not possible to determine whether any variation in performance is a result of variation in the performance of the test facility or variation in the performance of the master component itself.

OBJECTS AND SUMMARY OF THE INVENTION

An object is therefore to provide an improved method and apparatus for verifying the performance of a test facility over time.

According to an aspect of the invention there is provided a method of simulating, in a working apparatus, a working aerofoil component of a gas turbine engine with a master component, the working aerofoil component having one or more cooling flow inlets, one or more cooling flow outlets, and one or more cooling flow passages therethrough. The method comprises substituting the working aerofoil component in the working apparatus with the master component. The method comprises operating the working apparatus with the master component installed. The operation may be in the same manner as if the working aerofoil component were present (or installed) in the working apparatus. Accordingly, during the operation step, fluid flows into the master to component through one or more flow inlets in the master component, through an internal flow passage in the master component, and out of the master component through one or more flow outlets. The ratio of the number of flow outlets to the number of flow inlets is lower for the master component than for the working aerofoil component. Thus the ratio of the number of flow outlets to the number of flow inlets for the master component is lower than the ratio of the number of cooling flow outlets to the number of cooling flow inlets for the working aerofoil component.

Substituting the working aerofoil component in the working apparatus with the master component may comprise one or both of the steps of removing the working aerofoil component from the working apparatus and installing/fitting the master component to the working apparatus.

The direction of the fluid flow through the master component during the operating step may be substantially constant.

Using such a master component in the methods described herein can help to simplify the flow. This may mean that the flow through the master component is not subject to any (or at least is subject to less) variation over time, for example due to damage to the component and/or blockage of the component. In this way, the method can be used to validate the operation of working apparatus (for example a test apparatus, such as a flow bench) over time.

The master component used to simulate the effect of a working aerofoil component may be any suitable master component described herein.

The master component may be arranged such that, in the operating step, the flow rate of the fluid flow through the master component at given pressures at the inlet and outlet of the master component is substantially the same as the flow rate through the corresponding working aerofoil component at the same pressures at the inlet and outlet of the working aerofoil component.

According to an aspect of the invention, there is provided a method of validating the performance of a test facility that is suitable for testing components of a gas turbine engine. The test facility may comprise the working apparatus described above. The method comprises performing, at different times, the method of simulating a working aerofoil component of a gas turbine engine described above and elsewhere herein. The method comprises measuring a parameter representative of the performance of the test facility at each different time. The method comprises comparing the parameter measured at different times (for example at at least two different times) to check for variation in the performance of the test facility.

According to an aspect of the invention, there is provided a method of validating the performance (for example the consistency of the performance) of a test facility that is suitable for testing components of a gas turbine engine. The method comprises installing a master component as described herein in the test facility. The method comprises operating the test facility with a master component installed therein. The method comprises measuring a parameter representative of the performance of the test facility. The method comprises repeating the installing, operating, and measuring steps at different times. The method comprises comparing the parameter measured at the different times to check for variation in the performance of the test facility.

A master component can thus be used to ensure that the test facility is performing in a stable manner. For example, a master component can be used to check that the flow rate at a particular location in the test facility is constant over time and/or with use. According to an aspect of the invention, there is provided a master component (which may alternatively be referred to as a calibration component). The master component may be for use with any of the methods described herein. The master component is configured to simulate a corresponding working component (which may be a working component of a gas turbine engine, such as a working aerofoil component and may be referred to as a standard component). The master component comprises an attachment portion. The attachment portion may be configured to attach the master component to a working apparatus in the same manner as the corresponding working component would be attached. The master component has one or more flow inlets; one or more flow outlets; and an internal flow passage between the flow inlets and flow outlets. The ratio of the number of flow outlets to the number of flow inlets may be lower for the master component than for the working aerofoil component that it is configured to simulate.

Such a master component may have a simple flow pattern, or at least a simpler flow pattern than the flow pattern through the corresponding working component. Such a master component may therefore be used to give repeatable and/or stable measurements over time.

According to an aspect of the invention, there is provided a master component configured to simulate a corresponding working aerofoil component of a gas turbine engine. The working aerofoil that is simulated by the master component has standard flow passages therethrough and standard flow outlets. The master component comprises an attachment portion configured to attach the master component to a working apparatus. The attachment is in the same manner as the corresponding working aerofoil component would be attached to the working component. The master component comprises a flow inlet, a flow outlet, and an internal flow passage between the flow inlet and flow outlet. The flow through the internal flow passage of the master component may be simpler than the flow through the standard internal flow passages of the corresponding working aerofoil component.

Simpler flow may mean, for example, that the flow is less turbulent and/or that there is less total pressure loss as the flow passes through the respective internal flow passages and/or that the momentum of the flow remains more constant as it passes through the respective internal flow passages. Simpler flow may mean that the number of flow passages is reduced. Simpler flow may mean that the flow is less susceptible to variation over time, for example because the simpler flow passages are not as susceptible to blockage or partial blockage.

The ratio of the number of flow outlets to the number of flow inlets may be no more than 5:1. Additionally or alternatively, the average cross-sectional area of the flow outlets may be at least 20% of the average cross-sectional area of the flow inlets.

Providing a master component in which the ratio of the number of flow outlets to the number of flow inlets no more than 5:1 and/or the average cross-sectional area of the flow outlets is at least 20% of the average cross-sectional area of the flow inlets reduces the susceptibility to at least one of the flow passages (and/or flow outlets) becoming blocked, or partially blocked, at least compared with a working aerofoil component. This may be because, for example, the flow outlets are larger than the flow outlets of a working aerofoil component. The flow outlet or outlets of the master component may be large enough to reduce, and substantially eliminate, the chance of having a particle becoming lodged therein.

The master component may be a bespoke component. It may be designed specifically for use with the working apparatus, which may be a test facility, such as a flow bench. The master component may be designed for use in calibration of such a working apparatus. By arranging the master component as described herein, the internal flow through the master component can be simplified compared with a standard component (which may typically have a series of relatively complex and/or narrow cooling passages). This, in turn, may mean that the flow through the master component of the invention is consistent over time (or at least more consistent than the flow through the working aerofoil component), thereby enabling the performance of the working apparatus to be verified.

The average cross-sectional area of the internal flow passages may be greater than the average cross-sectional area of the standard flow passages of the corresponding working aerofoil component. This may mean that the average cross-sectional area over the entire length of internal flow passages is greater in the master component than in the corresponding working aerofoil component. This may result in the flow through the internal flow passage of the master component being simpler than the flow through the standard internal flow passages of the corresponding working aerofoil component, and thus less susceptible to variation over time. For example, larger flow areas are more resistant to being blocked or partially blocked by particles. Additionally or alternatively, having a larger average cross-sectional flow area may reduce the gas-washed internal flow area (i.e. the wall area of the flow passages), which may reduce the possibility of degradation of the internal walls and/or reduce the impact of any degradation of the internal walls on the flow.

Additionally or alternatively, the internal flow may be simplified by configuring the internal flow passage such that, in use, the direction of a fluid flow as it passes through the master component from the flow inlet to the flow outlet is substantially constant, or at least more constant than the corresponding working component. The direction of fluid flow through the master component may be substantially constant relative to the component itself. This may reduce the complexity of the flow by reducing the number of direction changes and/or by reducing the change in momentum through the internal flow passages. Generally, corners in internal flow passages, and in particular sharp (low radius of curvature) corners may be particularly susceptible to blockage or partial blockage. Therefore, reducing the number of corners in the internal flow passages and/or reducing the angle through which each one turns and/or increasing the radius of curvature of the corners may reduce the susceptibility of blockage, and thus lead to more consistent performance.

Additionally or alternatively, the average cross-sectional area of the flow outlets of the master component may be greater than the average flow area of the standard flow outlets of the corresponding working aerofoil component. This may result in the flow through the master component being simplified in relation to the flow through the working aerofoil component. For example, larger flow outlets may be less susceptible to blockage or partial blockage.

The internal flow passage may comprise at least one passage through which at least 50% of the fluid flow through the component passes. This ensures that a significant proportion of the flow passes through at least one of the passages, thereby simplifying the internal flow compared with the working aerofoil component.

The internal flow passage of the master component may comprise a main section through which all of the fluid flow through the master component passes. According to this feature, at least a part (and optionally all) of the internal flow passage has a cross-section through which all (or substantially all) of the flow passes. This means that there may be a single internal flow passage in that section, which can be of wider cross-section than conventional cooling passages through standard aerofoil components. This wider cross-section further simplifies the flow pattern, and reduces the possibility of flow variation over time, for example through blockage or partial blockage.

The internal flow passage (for example the main section through which all of the fluid flow passes) may have a circular cross-section along at least a portion thereof. Other cross-sections may also be used. Cross-sectional shapes that do not have discontinuities (i.e. that are smooth) could be used. For example, the cross-sectional shape could be oval, or elliptical. Having a smooth cross-sectional shape, such as a circle, oval, or ellipse, may help to further simplify the flow pattern. This may reduce the possibility of flow variation through the master component over time.

The ratio of the length of the main section through which all of the fluid flow passes to its diameter (or effective diameter in the case that the main section is not circular) may be in the range of from 2:1 to 20:1, for example in the range of from 5:1 to 10:1. For example, the ratio could be on the order of 7:1. Having the ratio in these ranges may help to ensure that the flow is uniform, or fully mixed, by the end of the main section, and thus by the time the flow reaches the flow outlet.

The master component may be configured such that, in use, the flow rate of the fluid flow through the master component at given pressures at the inlet and outlet of the master component is substantially the same as the flow rate would be through the corresponding working aerofoil component at the same pressures at the inlet and outlet of the working aerofoil component. The inlet and outlet pressures at which the flow rate through the master component may be the same as the flow rate through the working component may be specific, defined pressures, or they may be a range of pressures. According to this feature, the impact of the master component on the rest of the working apparatus may be the same as the impact of a corresponding component made to the baseline specification and geometry. The master component may be configured such that, in use, the flow rate of the fluid flow through the master component at a given pressure ratio (or at several different pressure ratios) across the master component is substantially the same as the flow rate would be through the corresponding working aerofoil component at the same pressure ratio(s) across the working aerofoil component.

The number of flow outlets that the master component comprises may be less than 20% of the number of standard flow outlets that the corresponding working aerofoil component comprises.

The master component may comprise fewer than five flow outlets. This means that the flow rate through the flow outlets can be high, or at least higher than the working component. It may mean that the size of each outlet is large enough to minimize and/or substantially eliminate the chance of a particle become lodged in an outlet. This may reduce the possibility of the flow outlet area changing over time, for example due to blockage or partial blockage. This may reduce the possibility of flow variation through the master component over time. The master component may comprise just one flow outlet. This means that all of the flow that flows through the master component exits through a single flow outlet. This ensures that the maximum possible flow rate is achieved through the flow outlet.

The (or each) flow outlet may be a circular outlet. A circular outlet may result in more uniform flow through the exit and/or through the internal flow passage of the master component. This may simplify the flow pattern through the master component. However, other shapes could be used for the flow outlet, for example continuous (or smooth) shapes, such as oval and elliptical. The area of the outlet (circular of non-circular) may be set by any appropriate means. For example, the area may be set to achieve a desired flow rate through the master component at a given pressure ratio (or a range of pressure ratios) across the component.

The (or each) flow outlet may be provided in a distal end surface of the master component. The distal end may be distal in relation to the attachment portion and/or in relation to the flow inlet. Providing the flow outlet at the distal end may assist in providing a smooth and/or uniform flow through the master component from flow inlet to flow outlet.

The thickness of the distal end surface surrounding the flow outlet may be in the range of 0.2 mm to 5 mm, for example in the range of from 0.3 mm to 1 mm, for example around 0.5 mm. However, the thickness of the distal end surface in the region of the orifice may be greater than this, for example 2 mm, 3 mm, 4 mm, 5 mm or greater than 5 mm, such as 20 mm. Having a thicker distal end surface in the region of the flow outlet may assist in preventing damage to the orifice. Having a thinner distal end surface in the region of the flow outlet may assist in achieving more uniform and/or cleaner flow separation.

A chamfer may be provided between the flow outlet and the distal end surface. The chamfer may help to prevent and/or reduce damage to the orifice, for example in the event that the master component is dropped. Any suitable chamfer angle could be used. For example, the angle relative to the surface normal of the distal end surface may be at least 30 degrees, for example at least 45 degrees, for example at least 60 degrees, for example at least 75 degrees.

The thickness of the distal end surface in the un-chamfered region may be at least 2 mm. For example, the thickness may be at least 3 mm, at least 4 mm, or at least 5 mm. As mentioned herein, having a thicker distal end surface may help to reduce the possibility of damaging the master component.

The master component may further comprise an outwardly extending protective wall extending from the distal end surface of the master component in a direction away from the attachment portion. The outwardly extending wall may be an extension of the external wall of the master component between the flow inlet and flow outlet. The outwardly extending protective wall may help to protect the flow outlet, and thereby help to ensure that the geometry of the master component does not change over time, and thus that the performance of the master component (for example the flow pattern/rate through the master component) is constant over time.

The attachment portion may be configured to attach the master component to a corresponding part of a gas turbine engine. Additionally or alternatively, the attachment is portion may be configured to attach the master component to a flow bench for testing components of a gas turbine engine. Thus, the working apparatus referred to herein, to which the master component may be attachable or attached to through the attachment portion, may be a gas turbine engine (or a part thereof), and/or a test facility, such as a flow bench.

The working component that the master component is configured to simulate may be a turbine blade, vane, or segment, or a compressor blade, vane, or segment. The flow through a turbine blade or compressor blade may be particularly complex, for example extending through a series of complex cooling flow passages and out through a plurality of exits, each of which may be small, and thus susceptible to blockage. As such, it may be particularly advantageous to replace turbine and/or compressor blades (and/or vanes) with a master component as described herein, so as to ensure that the performance of the components remains stable over time.

The attachment portion may be a conventional fir tree arrangement. The attachment portion may be the same as a root of a conventional turbine or compressor blade. This may allow the master component to be attached to the working apparatus in the same way as the corresponding turbine or compressor blade, thereby avoiding the need to modify the working apparatus. In this way, the master component may be interchangeable with the corresponding working component.

BRIEF DESCRIPTION OF THE DRAWINGS

Embodiments of the invention will now be described by way of example only, with reference to the accompanying diagrammatic drawings, in which.

DETAILED DESCRIPTION OF THE PREFERRED EMBODIMENTS

Figure 1:
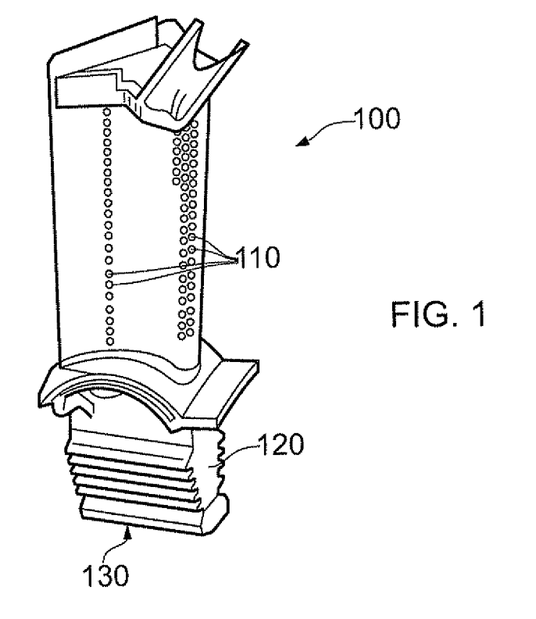
FIG. 1 is an isometric view of a standard turbine blade that may be used as a conventional master component.

FIG. 1 shows a typical turbine blade 100 for a gas turbine engine. Conventionally, such a turbine blade could be used as a master component for checking the consistency, or stability, of performance of a gas turbine engine test apparatus, or test facility, such as a flow bench. In order to check the consistency, the master component is calibrated (for example at an approved facility), and then used at regular intervals in the test facility. Suitable performance parameters may then be measured when the test facility is operated with the master component in place. These measured parameters may be compared with previous measurements to ensure that the test facility is operating in a stable manner, for example within allowed tolerances of the measured parameter. Suitable parameters include, but are not limited to, mass-flow rate through the master component for a specified pressure ratio across the master component and/or for a range of pressure ratios across the master component, pressure upstream and/or downstream of the master component for a given operating condition, and/or temperature at one or more positions of the master component.

Thus, the conventional master component is simply a standard cooled engine component (for example a turbine blade or vane, or segment), and may thus be referred to as a standard component 100. For example, the conventional master component could be a scrap version of a standard blade or vane. As shown in FIG. 1, the standard blade 100 has a large number of cooling holes 110. These cooling holes 110 are fed by a complicated network of internal cooling passages (not shown). Such cooling passages in the standard blade may be narrow, for example they may have a small diameter. In operation, air flows into the blade 100 through flow inlets in a root 120 in the direction of arrow 130, then passes through the multitude of internal cooling passages, before exiting the blade through the cooling holes 110.

A problem with using a blade that may have such a complicated arrangement of cooling passages and holes as a master component is that its performance may vary of time. For example, the cooling passages and/or holes may be blocked and/or damaged, for example as the blade is repeatedly fitted and removed from the test facility. Such damage and/or blockage could lead to variation in the measured performance parameter(s). Additionally or alternatively, the performance of the standard component 100 may vary between uses through release of material that had been blocking or partially blocking one or more of the flow passages.

This means that any variation in the measured performance parameter might not be wholly attributable to variation in performance of the test facility. As such, the conventional blade shown in FIG. 1 is unsatisfactory for use as a master component, because there is a high chance that it does not give repeatable results over time.

Figure 2:
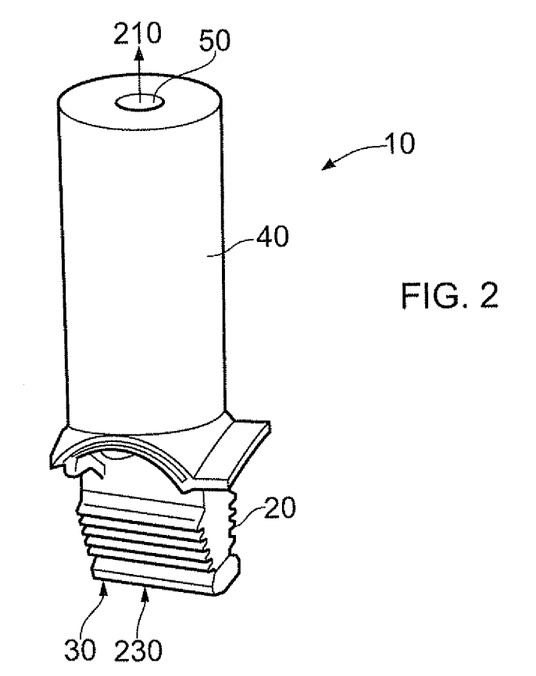
FIG. 2 is an isometric view of a master component according to an embodiment of the invention.

FIG. 2 shows a master component 10 according to an embodiment of the invention. The master component 10 of FIG. 2 has an attachment portion, or root, 20. The root 20 is for attaching the master component 10 to a test apparatus. The root 20 of the master component 10 is substantially the same as the root 120 of the standard component 100. This means that the master component 10 can be attached to and/or removed from the test facility with which it is to be used in the same manner as the standard component 100. As shown in FIG. 2, the root 20 may thus be a fir-tree (or Christmas-tree) arrangement. Any other suitable attachment portion may be used, such as a dovetail arrangement.

In use (i.e. when the master component 10 is attached to the test facility), air enters the master component 10 through one or more inlets 30. The inlets 30 may be in the root 20. The inlets 30 may take substantially the same form as the inlets of the standard component 100. Alternatively, the flow inlets 30 may be different to those of the standard component 100. In the embodiment shown in FIGS. 2 and 3, there are two flow inlets 32, 34 (see FIG. 3).

Figure 3:
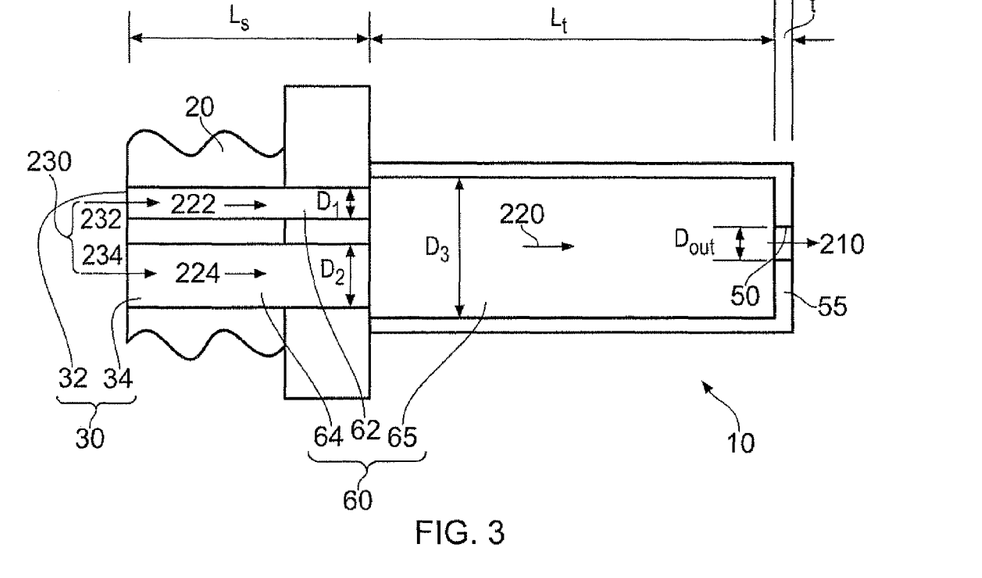
FIG. 3 is a side cross-sectional view of a master component according to an embodiment of the invention.

The master component 10 has a main body 40. The main body 40 may be manufactured using any suitable method and material, for example a material that is resistant to damage and/or staining/deterioration, such as stainless steel. The master component 10 has a flow outlet, or orifice, 50. As shown in FIG. 3, the master component 10 has an internal flow passage 60 between the flow inlet 30 (which, in the FIG. 3 embodiment, comprises a first inlet 32 and a second inlet 34) and the flow outlet 50. The internal flow passage 60 is formed at least partially in the main body 40. In the embodiment of FIG. 3, the internal flow passage 60 comprises a main internal flow passage 65 through which all of the air that flows through the master component 10 passes. The embodiment of FIG. 3 also has first and second secondary flow passages 62, 64 that link the first inlet 32 and the second inlet 34 to the main internal flow passage 65 respectively. The master component 10 may have a single internal flow passage 60, without any secondary internal flow passages 62, 64. Alternatively, the master component 10 may have a main internal flow passage 65 together with one of more secondary internal flow passages 62, 64, which may be referred to collectively as an internal flow passage 60, as in the example shown in FIG. 3. Other, possibly more complex, arrangements of internal flow passages 60 may be used.

The main internal flow passage 65 of the master component shown in FIG. 3 is generally cylindrical, or tubular. The cross-section in the direction normal to the flow direction (i.e. the cross-section of the flow area) is circular in the FIG. 3 embodiment. The secondary flow passages 62, 64 are also generally cylindrical (i.e. have circular cross-section) in the FIG. 3 master components. Having cylindrical internal flow passage(s) 60 may result in the master component having more stable performance over time (i.e. repeatable). This may be because there are no discontinuities, or corners, which could provide a site for blockage, or partial blockage of the flow passages. Additionally or alternatively, cylindrical flow passages may have manufacturing and/or mechanical advantages.

However, other shapes may be used for the internal flow passage(s) 60. For example, the internal flow passage(s) 60 may be elliptical or oval in cross-section. Alternatively, the internal flow passage(s) 60 may take any other suitable regular or irregular shape. The cross-section of the internal flow passage(s) 60 may vary along theirs length in some embodiments.

Any reference to diameter herein (for example in relation to internal flow passages 60, 62, 64, 65 and/or inlets 30, 32, 34 and/or outlet(s) 50) may be taken to mean effective diameter, for example to take into account that the shapes may not be circular in cross-section. By way of clarification, the effective diameter for any given shape may be defined as:

Effective Diameter=$\sqrt{(4*Area/\pi)}$

Where: "Area" is the cross-sectional area, or flow area, of the shape.

In the illustrated embodiments, the main internal flow passage 65 has a diameter D3, the secondary internal flow passages 62, 64 have diameters D1 and D2. The diameters D1, D2, D3 may be effective diameters. D2 and D1 may either be the same or different. In the illustrated embodiments, D2 is greater than D1. Purely by way of non-limitative example only, the ratio of the diameter D3 of the main internal flow passage 65 to the diameter D1, D2 of one or both of the secondary internal flow passages 62, 64 may be in the range of from 2:1 to 10:1, for example in the range of from 3:1 to 6:1, for example on the order of 4:1. Also by way of example only, the diameter D3 of the main internal flow passage 65 may be in the range of from 5 mm to 100 mm, for example in the range of from 10 mm to 75 mm, for example in the range of from 20 mm to 50 mm, for example on the order of 30 mm. Also by way of example only, the diameter D1, D2 of each of the secondary internal flow passages 62, 64 may be in the range of from 2 mm to 50 mm, for example in the range of from 10 mm to 40 mm, for example in the range of from 20 mm to 30 mm.

Of course, the absolute diameters D1, D2, D3 will depend on the application (for example on the standard component 100 that the master component 10 is simulating), and so the diameters D1, D2, D3 may be outside these ranges in some embodiments. For example, a master component to simulate a large industrial gas turbine blade may have an outlet diameter D3 greater than 100 mm and a secondary internal flow passage diameter D1, D2 greater than 50 mm, whereas a master component to simulate a blade on a relatively small gas turbine engine (for example for application in a helicopter) may have an outlet diameter D3 less than 5 mm and a secondary internal flow passage diameter D1, D2 less than 2 mm.

The master component 10 is arranged such that the average flow area of the internal flow passage 60 is greater than the average flow area of the standard internal flow passages of the standard component 100. In this regard, the average flow area may be taken as the average flow area over the total length of flow passages in the master component 10 and the standard component 100 respectively. For example, referring to the FIG. 3 arrangement, the average flow area may be calculated as:

$$\text{Average Flow Area} = ((\pi x (D3)^2 \times Lt)/4 + \\ (\pi x (D1)^2 \times Ls)/4 + \\ (\pi x (D2)^2 \times Ls)/4)/ \\ (Lt + Ls + Ls) \\ = (\pi/4) \times (((D3)^2 \times Lt) + \\ ((D1)^2 \times Ls) + ((D2)^2 \times Ls))/ \\ (Lt + Ls + Ls)$$

In general terms, the average flow area may be given as:

$$= (\pi/4) \times \sum D_i^2 L_i / \sum L_i$$

Where "i" represents each flow passage 62, 64, 65 within the master component 10 (or standard component 100), and Σ represents the sum over every internal flow passage 62, 64, 65.

Thus, the value of $\Sigma D_i^2 L_i / \Sigma L_i$ may be greater for the master component 10 than for the standard component 100, where D may represent the diameter or effective diameter.

In still more general terms, the value of $\Sigma A_i L_i / \Sigma L_i$ may be greater for the master component 10 than for the standard component 100, where $A_i$ is the area of flow passage "i".

In use, flow may enter the component through one or more of the inlets 32, 34. In general, the number and/or arrangement of flow inlets 32, 34 of the master component 10 may correspond to the number and/or arrangement of flow inlets of the standard component 100 that the master component 10 is configured to simulate. Indeed, in some embodiments, the attachment portion 20 of the master component 10 may be substantially the same as the root 120 of the standard component 100 that the master component 10 is configured to simulate, including the internal flow passages in the roots 20, 120.

In other embodiments, the arrangement of internal flow passage(s) and/or flow inlet(s) may be different to that shown in FIG. 3. For example, there may only be one flow inlet 30, or there may be more than two flow inlets, for example 3, 4, 5, or more than 5 flow inlets. Each flow inlet may have a corresponding secondary flow passage 62, 64. Each secondary flow passage may be fluidly connected to and upstream of a main internal flow passage 65. In some embodiments, there may not be a main flow passage through which all of the air that flows through the master component 10 passes. For example, the flow through each inlet 32, 34 may remain separated from the flow through the other inlet(s) as it passes through the entire master component 10, and exit through the component through a corresponding flow outlet. The corresponding flow outlet may thus only be in fluid communication with a single inlet. In some embodiments, there may not be any secondary flow passages, such that the flow through into the flow inlet(s) 30 enters directly into the main internal flow passage 65.

The exact arrangement of the passages in the root (or attachment portion) 120 of a standard component 100 may be more complicated than described thus far. Thus, the arrangement of the flow passages 60 may be more complicated and/or there may be more internal flow passages 60 than shown in the FIG. 3-FIG. 6 embodiments. There may be more than two passages 62, 64 and/or one or more of these may split or merge. As described herein, in some embodiments, the internal flow passages in the attachment portion (or root) 20 of the master component 10 may be substantially the same as the internal flow passages in the attachment portion 120 of the standard component 100. However, in some embodiments, the internal passage arrangement of the master component 10 may be simplified compared to the standard component 100, for example within the attachment portion 20 as well as the main body 40.

The ratio of the length of the main internal flow passage 65 through which all of the fluid flow passes to the diameter (or effective diameter) D1, D2 of the outlets of each of the secondary internal flow passages 62, 64 may be greater than 5:1, for example in the range of from 5:1 to 10:1. For example, the ratio could be on the order of 6:1, 7:1, 8:1, or 9:1. Having the ratio in the range of from 5:1 to 10:1 (or greater) may help to ensure that the flow is uniform, or fully mixed, by the end of the main internal flow passage 65, and thus by the time the flow reaches the flow outlet 50. In some cases, however, the ratio could be greater than 10:1, or less than 5:1. In cases in which the cross-sectional shape of the main section is not circular, the diameter used in the above ratios may be an effective diameter, as defined herein.

Figure 4:
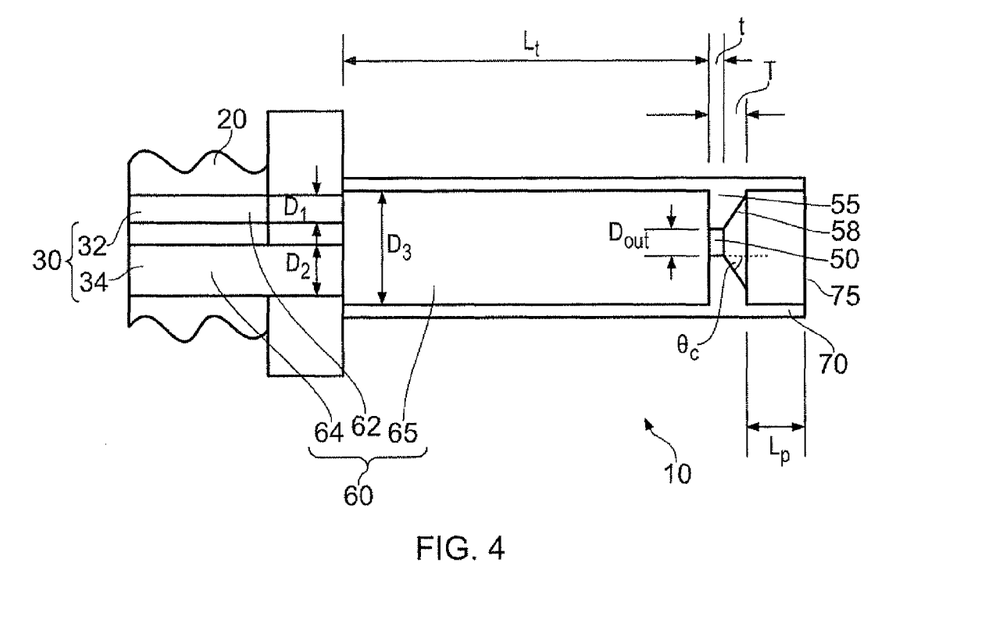
FIG. 4 is a side cross-sectional view of a master component according to another embodiment of the invention.

The master component 10 shown in FIG. 3 and the master component 10 shown in FIG. 4 each has a single flow outlet 50 (which may be referred to as an opening or orifice or exit, or a metering hole). All of the flow that passes through the master component 10 passes through this single flow outlet 50 in these master components. The single flow outlet 50 is circular, i.e. a cross-section through the outlet 50 in the direction normal to the flow through the outlet is circular. The flow outlet 50 is formed in a distal end surface 55 in FIG. 3. The thickness t of the distal end surface 55 in which the flow outlet 50 is formed may be in the range of from 0.3 mm to 1 mm, for example 0.4 mm to 0.6 mm, for example 0.5 mm. Alternatively, the thickness t of the distal end surface 55 in which the flow outlet 50 is formed may be less than 0.3 mm or greater than 1 mm.

Other shapes of flow outlet 50 are also possible. By way of example only, the flow outlet 50 could be oval, elliptical, triangular, square, rectangular, pentagonal, hexagonal, heptagonal, or octagonal. Indeed, any suitable regular or non-regular shape could be used. In some cases, using a hole shape that is smooth (i.e. is continuous, or does not have corners) may result in more repeatable performance, for example because there is no specific region (such as a corner) which may be more susceptible of becoming partially blocked or damaged.

The size of the flow outlet 50 (for example flow area) may be set to provide a desired flow rate through the master component 10. For example, the flow outlet 50 may be sized such that the flow through the master component 10 at one or more operating conditions (for example inlet and outlet pressures and/or pressure ratio) is the same as the flow through the standard blade 100 that it represents. The area of the flow outlet 50 may be set by calculation, for example using the Cd value for the flow outlet 50, the losses through the flow inlet and internal flow passage, and the pressure at inlet and outlet of the master component. A suitable Cd value could be obtained by experiment, or from literature. Alternatively, the flow area of the outlet 50 could be set by trial and error.

The flow outlet 50 in the FIG. 3 example is not a cooling hole. The master component 10 may not comprise any cooling holes or flow outlets. For example, the master component 10 may not have any effusion (or film) cooling holes. This is in contrast to the standard component 100, which has a large number of effusion cooling holes 110.

The cross-sectional area (or flow area) of the flow outlet 50 of the master component 10 may be greater than the average cross-sectional area of the cooling holes 110 of the standard component 100. In embodiments with more than one flow outlet 50, the average cross-sectional area (or flow area) of the flow outlets 50 of the master component 10 may be greater than the average cross-sectional area of the cooling holes 110 of the standard component 100. Purely by way of example only, the cross-sectional area of the flow outlet 50 (or in the case of an embodiment with more than one flow outlet 50, the average cross-sectional area of the flow outlets 50) may be in the range of from 5 mm$^2$ to 50 mm$^2$, for example in the range of from 7 mm$^2$ to 40 mm$^2$, for example in the range of from 10 mm$^2$ to 30 mm$^2$, for example in the range of from 15 mm$^2$ to 20 mm$^2$. However, embodiments may have (average) flow outlet areas outside these ranges, depending on, for example, the component 100 that is being simulated.

The ratio of average cross-sectional area (or flow area) of the flow outlet(s) 50 to the average cross-sectional area (or flow area) of the flow inlet(s) 32, 34 may be greater for the master component 10 than for the standard component 100. The average cross-sectional area may be calculated by dividing the total inlet (or outlet) area by the total number of inlet (or outlet) holes. Purely by way of example only, the average cross-sectional area (or flow area) of the flow outlet(s) 50 may be at least 5%, for example at least 10%, for example at least 20%, for example at least 30%, for example at least 50%, for example at least 100%, for example at least 200% of the average cross-sectional area (or flow area) of the flow inlet(s) 32, 34 in the master component 10. Although the average cross-sectional area of each flow outlet 50 of the master component 10 may be greater than the average cross-sectional area of the cooling holes 110 of the standard component 100, the total cross-sectional area of the flow outlet(s) 50 of the master component 10 may be similar to, or the same as, the total cross-sectional area of the flow outlets 110 of the standard component 100. Similarly, the ratio of the total cross-sectional area of all of the flow outlet(s) 50 of the master component 10 to the total cross-sectional area of all of the flow inlet(s) 32, 34 of the master component 10 may be substantially the same as the same ratio for the standard component 100. The total area of the flow outlet(s) 50 of the master component 10 may be chosen such that the master component 10 has substantially the same flow characteristics (for example in terms of mass flow rate through the component 10 as a function of pressure across it) as the standard component 100.

The master component may have more than one flow outlet 50. For example, the master component may have 10 or fewer flow outlets, for example 2, 3, 4, 5, 6, 7, 8, or 9 flow outlets. Generally, the fewer flow outlets that the master component has; the greater the mass flow rate through each flow outlet.

This may help to reduce the possibility of the flow outlet area changing over time, for example due to blockage or partial blockage.

The ratio of the number of flow outlet(s) 50 to the number of flow inlet(s) 32, 34 may be lower for the master component 10 than for the standard component 100. Purely by way of example only, the ratio of the number of flow outlet(s) 50 to the number of flow inlets 32, 34 in the master component may be no greater than 10:1, for example no greater than 5:1, for example no greater than 4:1, for example no greater than 3:1, for example no greater than 2:1, for example no greater than 1:1. In the example of FIG. 3, the ratio is 1:2. In some embodiments, the ratio may be even lower, for example 1:3, 1:5, or lower.

The external shape of the main body 40 of the master component 10 may take any suitable shape. For example, the external surface of the main body 40 may be generally cylindrical, i.e. have a circular cross-section. Other cross-sectional shapes may also be used for the external surface, for example elliptical, oval, or any regular or irregular shape. The external shape of the main body 40 need not be an aerofoil. In some embodiments, the external cross-sectional shape of the main body 40 may change along its length (i.e. along a longitudinal direction of the master component 10). For example, the external cross-sectional shape may change from being an aerofoil or oval shape towards the attachment portion 20 to a substantially circular shape towards the outlet 50 (i.e. towards the tip).

The direction of the flow through the master component 10 is shown in FIG. 3 at the inlet 30 (by arrow 230, which splits into arrows 232, 234), through the secondary internal flow passages 62, 64 (by arrows 222, 224), through the main internal flow passage 65 (by arrow 220) and through the flow outlet 50 (by arrow 210).

As can be seen clearly from the flow arrows, the flow direction is constant, or substantially constant, as the flow passes through the master component 10. In the FIG. 3 arrangement, the flow direction is aligned with, or substantially aligned with, a major axis (which may be a longitudinal axis) of the master component 10. Thus, the flow through the internal flow passage 60 (which may include the secondary internal flow passages 62, 64, and the main internal flow passage 65) may be aligned with, or substantially aligned with, a longitudinal axis of the master component 10. The major (or longitudinal) axis with which the internal flow may be aligned may correspond to the radial direction of the standard component (such as a turbine vane) 100 that the master component 10 is replicating, when the standard component is installed in a gas turbine engine.

Providing a master component 10 in which the flow direction is at least substantially constant through the component may result in a simplified flow pattern through the master component 10 compared with the standard component 100. For example, a conventional standard component 100 may have at least one internal bend and/or corner that substantially changes the direction of the flow. The present invention may not have such an internal bend or corner that substantially changes the direction of the flow. This may mean that there is no significant bend or corner in which the flow area might become at least partially blocked. This may occur, for example, due to stagnant or reduced velocity flow leading to particles becoming deposited or lodged in corner/bend regions.

In the embodiment of FIG. 3, the flow direction is not intended to change as the flow passes through the master component 10. In some embodiments, there may be a deviation in the flow, for example a gradual deviation, in the flow direction as it passes through the component. It will be appreciated that a purpose of having the direction of the fluid flow substantially constant is to allow the flow passage to be smooth, and thus to avoid any unnecessary sharp (e.g. high radius of curvature) corners. In this regard, the numerous sharp bends of the internal passages of the standard component 100 may be considered to be unnecessary, because they are for the purposes of improved cooling efficiency, which may not be required for a master component 10. As such, some master components 10 may include slight and/or gradual changes in flow direction. Some embodiments, however, may include one or more significant direction changes, for example on the order of 90 degrees. For example, some embodiments may have one or more flow inlets on a side surface of the attachment portion 20 (for example perpendicular to the longitudinal direction of the master component 10) of the master component 10. Such flow inlets may turn through approximately 90 degrees, for example within the attachment portion 20, in order to become aligned with the longitudinal direction of the master component 10.

The embodiment shown in FIG. 4 is substantially the same as the embodiment shown in FIG. 3 in many aspects. Like features in the FIG. 3 and FIG. 4 embodiments have the same reference numerals. It will be appreciated that any description or disclosure given herein is applicable to all embodiments. For example, any description or disclosure made in relation to features that are common or compatible between embodiments applies to all embodiments.

The FIG. 4 embodiment has a protrusion or extension 70 extending from the surface in which the flow outlet 50 is formed. The protrusion 70 may protect the flow outlet 50, for example from damage during fitting/removal or during use. As such, the protrusion 70 may be referred to as a protective protrusion 70. The protrusion 70 may be a thin wall structure. The protrusion 70 may extend around substantially all of the surface 55 in which the flow outlet 50 is formed. As such, the protrusion 70 may encircle the flow outlet 50. The protrusion 70 may extend a suitable distance to protect the flow outlet 50 from damage. Typically, the protrusion 70 may extend from the distal end surface 55 a distance Lp in the range of from 2 mm to 50 mm, for example 5 mm to 10 mm, although embodiments may have a protrusion distance Lp less than 2 mm or greater than 50 mm, for example depending on the size and application of the master component 10. The opening 75 formed by the protrusion 70 may take the same shape as the cross-sectional shape of the main body 40. Thus, for example, the opening 75 may be circular. A circular opening may be particularly beneficial as it may be easy to close (for example using a plug), for example for further protection and for leak testing of the test apparatus, which may include the master component 10 itself.

The FIG. 4 embodiment is provided with a chamfer (or taper 58) in the distal end surface 55. The chamfer 58 may extend between the distal end surface 55 and the flow outlet 50. The angle θc between the longitudinal (or axial) direction and the chamfer surface 58 is preferably greater than 30 degrees, for example greater than 45 degrees, for example greater than 60 degrees, for example greater than 75 degrees. The thickness T of the distal end surface 55 (which may be referred to as an orifice plate 55) in the un-chamfered region may be greater than 1.5 mm, for example greater than 2 mm, for example greater than 3 mm, for example in the range of from 3 mm to 5 mm. The thickness t of the distal end surface 55 in which the flow outlet 50 is formed (i.e. at the bottom end, or orifice end) may be similar to the thickness of the distal end surface 55 of the FIG. 3 embodiment. For example the thickness t may be in the range of from 0.3 mm to 1 mm, for example 0.4 mm to 0.6 mm, for example 0.5 mm.

Although FIG. 4 shows both the protective protrusion 70 and the chamfer 58, embodiments of the invention may include one, both, or none of these features.

Figure 5:
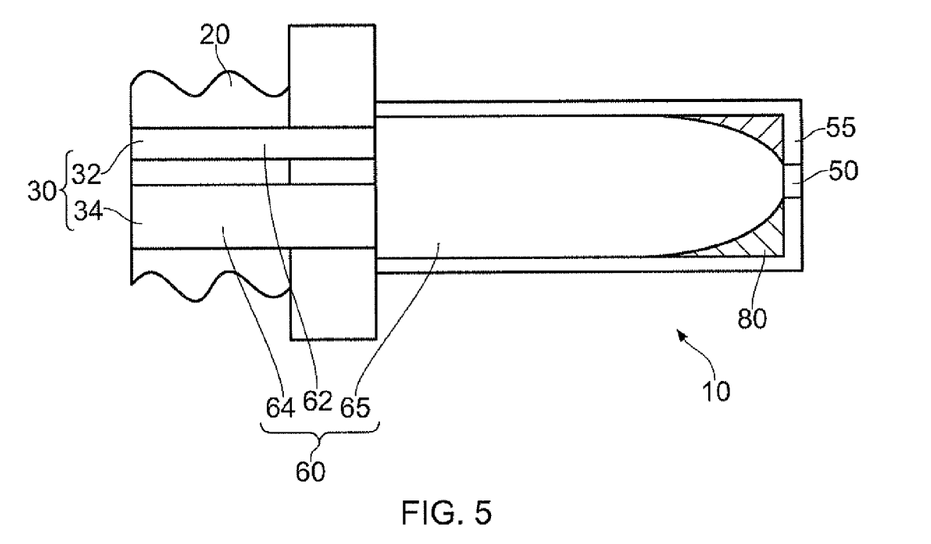
FIG. 5 is a side cross-sectional view of a master component according to another embodiment of the invention.

FIG. 5 shows a further embodiment of master component 10. The FIG. 5 embodiment has a modified internal surface 80 of the main internal flow passage 65. The modified internal surface provides a smooth transition between the flow outlet 50 and the side surface of the main internal flow passage 65. This may help to still further smooth and/or simplify the flow path, thereby reducing the possibility of partial blockage along the flow path, and improving the consistency of performance of the master component 10. In the embodiment shown in FIG. 5, the modified internal surface 80 forms a smooth internal surface, with no discontinuities in gradient. In other words, the modified surface 80 is tangential to the unmodified internal surface at the transition line. In other embodiments, however, the modified internal surface 80 may not be tangential to the original surface along the transition line. For example, the cross-section of the modified surface 80 in the view shown in FIG. 5 could be a straight line between the original internal surface of the main internal flow passage 65 and the flow outlet 50.

The mass flow rate through the master component 10 for a given pressure (for example given pressure ratio) between the inlet 30 and the outlet 50 may typically be determined at least in part by the total area of the flow outlet 50. This may also be the case with the standard component 100 that the master component 10 is arranged to simulate. Typically, the total cross-sectional area of downstream portions of the flow path, such as the flow inlets 30, would be greater than the total cross-sectional area of the flow outlet(s) 50, so that the flow rate is at least substantially determined by the total flow outlet area for a given pressure ratio. However, some embodiments may include internal flow restrictors in one or more of the internal passages 60 (for example in the main internal flow passage 65). An example of such an embodiment is shown in FIG. 6.

Figure 6:
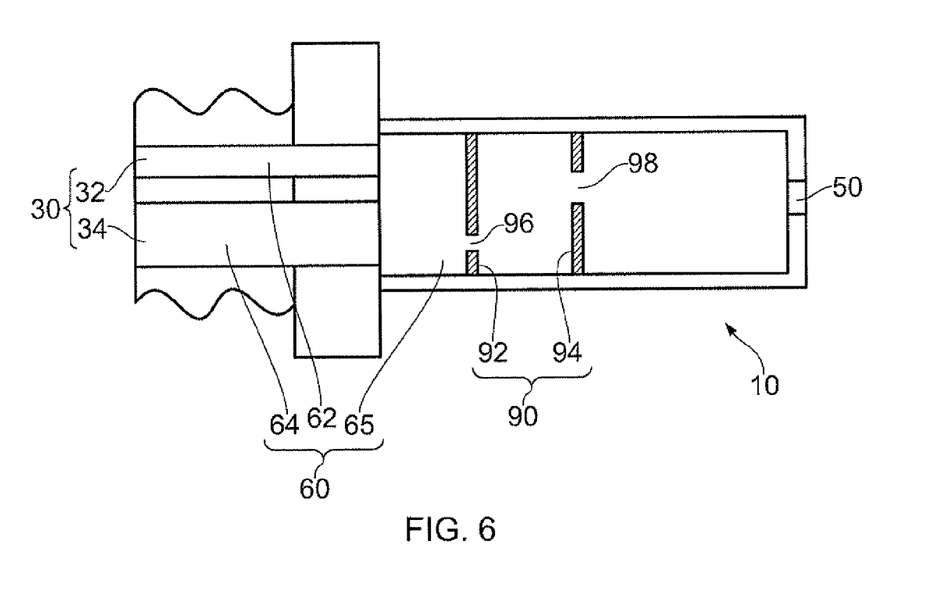
FIG. 6 is a side cross-sectional view of a master component according to another embodiment of the invention.

The FIG. 6 embodiment has two internal flow restrictors 92, 94. Each of the internal flow restrictors 92, 94 has a flow orifice 96, 98, which may be any shape, for example circular. In other embodiments, each internal flow restrictor 92, 94 may have more than one flow orifice 96, 98, through which the flow passes. Other embodiments may have different numbers of internal flow restrictors 92, 94, for example one, three, four, five, six, seven, eight, none, ten, or more than ten. Of course, other embodiments may have no internal flow restrictors 92, 94.

The flow restrictors 90 may allow the master component 10 to better replicate the flow properties of the standard component 100, for example over a range of pressure ratios across the respective components 10, 100. The flow restrictors 90 may help to replicate, or simulate, the multitude of internal flow passages in the standard component 100, but without having the narrow internal flow passages present, and the associated risk of blockage or partial blockage.

It will be appreciated that any compatible features of any of the embodiments described herein may be combined together. Furthermore, any description relating to a particular embodiment may apply to any other embodiment.

We claim:

1. A method of validating the performance of a test facility that is suitable for testing components of a gas turbine engine, the test facility comprising a working apparatus, the method comprising:

simulating, at different times, a working aerofoil component of a gas turbine engine with a master component in the working apparatus, the working aerofoil component having one or more cooling flow inlets, one or more cooling flow outlets, and one or more cooling flow passages therethrough;

measuring a parameter representative of the performance of the test facility at each different time; and comparing the parameter measured at the different times to check for variation in the performance of the test facility, wherein:

simulating the working aerofoil component of the gas turbine engine with the master component comprises:

substituting the working aerofoil component in the working apparatus with the master component; and operating the working apparatus in the same manner as if the working aerofoil component were present in the working apparatus, such that fluid flows into the master component through one or more flow inlets in the master component, through an internal flow passage in the master component, and out of the master component through one or more flow outlets; and the ratio of the number of flow outlets to the number of flow inlets is lower for the master component than for the working aerofoil component.

2. A method according to claim 1, wherein the master component is arranged such that, in the operating step, the flow rate of the fluid flow through the master component at given pressures at the inlet and outlet of the master component is substantially the same as the flow rate through the corresponding working aerofoil component at the same pressures at the inlet and outlet of the working aerofoil component.

3. A master component for use in the method of claim 1 to simulate the corresponding working aerofoil component, the master component comprising:

an attachment portion configured to attach the master component to the working apparatus in the same manner as the corresponding working aerofoil component;

said one or more flow inlets;

said one or more flow outlets; and said internal flow passage between the flow inlets and the flow outlets.

4. A master component according to claim 3, wherein the ratio of the number of flow outlets to the number of flow inlets is no greater than 5:1.

5. A master component according to claim 3, wherein the average cross-sectional area of the internal flow passage of the master component is greater than the average cross-sectional area of the cooling flow passages of the corresponding working aerofoil component.

6. A method master component according to claim 3, wherein the average cross-sectional area of the flow outlets of the master component is at least 20% of the average cross-sectional area of the flow inlets of the master component.

7. A master component according to claim 3, wherein the internal flow passage of the master component comprises at least one passage through which at least 50% of the fluid flow through the component passes.

8. A master component according to claim 3, wherein:
the internal flow passage of the master component comprises a main section through which all of the fluid flow through the master component passes.

9. A master component according to claim 3, wherein the internal flow passage is configured such that, in use, the direction of a fluid flow as it passes through the master component from the flow inlet(s) to the flow outlet(s) is substantially constant.

10. A master component according to claim 3, wherein the master component comprises fewer than five flow outlets.

11. A master component according to claim 3, wherein the or each flow outlet of the master component is a circular outlet.

12. A master component according to claim 3, wherein:
   the or each flow outlet is provided in a distal end surface of the master component.

13. A master component according to claim 3, wherein the average flow area of the one or more flow outlets of the master component is greater than the average flow area of the one or more cooling flow outlets of the corresponding working aerofoil component.

14. A master component according to claim 3, wherein the number of flow outlets that the master component comprises is less than 20% of the number of cooling flow outlets that the corresponding working aerofoil component comprises.

15. A master component according to claim 3, wherein the attachment portion is configured to attach the master component to a corresponding part of a gas turbine engine and/or to a flow bench for testing components of a gas turbine engine.

16. A master component according to claim 3, wherein the working aerofoil component that the master component is configured to simulate is a turbine or compressor blade, vane, or segment.

17. A master component according to claim 3, wherein the attachment portion is a conventional fir-tree arrangement.

* * * * *